Patented Dec. 30, 1941

2,268,108

UNITED STATES PATENT OFFICE 2,268,108

INSECTICIDAL COMPOSITION

Benjamin Collie, Rowland Hill, and Wilfred Archibald Sexton, Blackley, Manchester, England, assignors to Imperial Chemical Industries Limited, a corporation of Great Britain No Drawing. Application March 10, 1939, Serial No. 261,142. In Great Britain March 11, 1938

8 Claims. (Cl. 167—22)

This invention relates to the manufacture of insecticidal compositions. More particularly it relates to the manufacture of insecticidal compositions containing as an active ingredient a substituted aminoacetonitrile of the general formula—

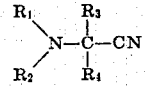

In the above formula $R_3$ and $R_4$ may be hydrogen or alkyl, alkenyl, aralkyl or aryl groups. They may be alike or different or may together form a closed methylene chain. $R_1$ and $R_2$ may be the same or different alkyl, cycloalkyl, aralkyl or aryl groups or one of them, but not both, may be hydrogen, but when $R_1$ is aryl and $R_2$ is hydrogen, then $R_3$ and $R_4$ must together contain at least two carbon atoms. Alternatively $R_1$ may be hydrogen and $R_2$ the group —$CHR_5$—CN, ($R_5$ being hydrogen or an alkyl or aryl group) or $R_1$ and $R_2$ together may form a closed methylene chain.

It is thought that certain of the substances corresponding to the above formula, for example, methylene aminoacetonitrile in which $R_1$ and $R_2$ together constitute a single methylene group and $R_3$ and $R_4$ are hydrogen, may actually be polymeric; for example, the true formula of methylene aminoacetonitrile may be

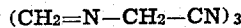

Such compounds are to be considered within the scope of the invention as described above and as set forth in the appended claims.

Many of the above compounds are known. Others may be made by bringing about interaction between a suitably constituted aldehyde or ketone, a primary or secondary amine and hydrogen cyanide. If desired the interaction may be by stages. For instance the cyanhydrin of the aldehyde or ketone may first be made and subsequently caused to react with the amine (compare Berichte der deutschen chemischen Gesellschaft, 1882, vol. 15, p. 2034). Alternatively derivatives of the aldehyde or ketone may be used, for example their bisulphite compounds (compare Berichte der deutschen chemischen Gesellschaft 1904, vol. 37, p. 4073).

According to the invention an insecticidal composition comprises a compound of the general formula hereinbefore given or a polymer thereof admixed with an inert pulverulent diluent or carrier such as talc, chalk, kieselguhr or bentonite, to which is added if desired a water-absorbent or dust-binding agent such as wool fat; or it comprises such a compound or a polymer thereof dissolved, suspended or emulsified in water or a suitable inert organic liquid, such, for example, as a mineral or vegetable oil, to which may be added, before, during or after the operation of dissolution or dispersion, "stickers," "spreaders," wetting, penetrating or emulsifying agents.

By a further feature of the invention there may also be added to such insecticidal compositions other organic substances which are themselves insecticides such, for example, as nicotine, derris extract, pyrethrum extract, rotenone, aliphatic or aromatic isothiocyanates or the the amides described in British applications Nos. 26,875/37 and 34,656/38 and insecticidal compositions containing such additional toxic agents are likewise comprised within the scope of the invention.

The so-called "stickers" are substances such, for example, as glue or rosin soap, which are added to insecticidal compositions which are intended to be used as horticultural or agricultural sprays to assist the retention on the leaf surface of the active deposit which is left when the solvent or carrying fluid with which the composition has been made has drained or evaporated away.

"Spreaders" are substances such, for example, as conventional wetting or penetrating agents, which are similarly used to secure uniform and complete wetting of the leaf surface by the spray.

In carrying into practice that feature of the invention which relates to the making of a liquid preparation to be used as an insecticidal spray for horticultural or agricultural purposes, the active ingredient may conveniently be dissolved or dispersed in a large bulk of water or inert organic liquid with the aid (in the case of a dispersion) of a suitable quaternary ammonium salt, sulphonated oil or other dispersing agent, and with the addition, if desired, in either case of one or more auxiliary agents such as are described above. Alternatively a concentrated preparation which is more convenient for storage and transport may be made initially and this may be diluted with the carrying fluid shortly before use. Such a concentrated preparation may be a dispersion, a wettable powder, a true solution or a so-called "miscible oil" or "self-emulsifiable oil," which, although a clear and apparently homogeneous liquid, is actually a colloidal solution.

As suitable inert organic liquids for making liquid insecticidal preparations, there may be mentioned, for example, hydrocarbons such as decolourised mineral oils or spindle oil, vegetable oils, for example, cotton seed oil or castor oil, tetrachloroethane or ethylene dichloride.

As substituted aminoacetonitriles suitable for making the insecticidal compositions of the invention there may be mentioned, for example, α-diethylamino-octoic nitrile, α-diethylamino-nonadecanoic nitrile, α-diethylamino-phenylacetonitrile, dibutylamino-acetonitrile, α-dibutylamino-octoic nitrile, α-dodecylamino-valeronitrile, α-dodecylamino-octoic nitrile, α-dodecylamino-3:4-pentenoic nitrile, methyleneaminoacetonitrile, iminodiacetonitrile, α-anilino-iso-butyronitrile, α-anilino-sec-valeronitrile, α-anilino-α-methyl-iso-hexoic nitrile, 1-anilino-1-cyano-cyclohexane, N-phenyl-N-methylaminoacetonitrile, α-(N-phenyl-N-methyl-amino)-octoic nitrile, α-(N-phenyl-N-methyl-amino)-valeronitrile, α-(N-phenyl-N-ethyl-amino)-valeronitrile, piperidino-acetonitrile, α-piperidino-octoic nitrile, α-cyclohexyl-amino-octoic nitrile and α-(N-cyclohexyl-N-ethyl-amino)-octoic nitrile.

The invention is illustrated but not limited by the following examples in which the parts are by weight.

*Example 1*

50 parts of N-phenyl-N-methylaminoacetonitrile are mixed with 50 parts of an aqueous solution containing 0.5 part of sodium 4-oleylamino-1-methoxybenzene-2-sulphonate and the mixture is passed through a valve homogeniser. There is thus obtained an emulsion which, when diluted with about 250 times its weight of water, gives a liquid suitable for use as an insecticidal spray.

If instead of the N-phenyl-N-methylaminoacetonitrile there is used an equal weight of α-diethylaminooctoic nitrile, α-diethylamino-phenylacetonitrile, or dibutylamino-acetonitrile, a similar liquid preparation suitable for use as an insecticidal spray is obtained.

*Example 2*

10 parts of N-phenyl-N-methylaminoacetonitrile, 75 parts of talc, 10 parts of bentonite and 5 parts of sodium cetyl sulphate are charged into a ball mill and the mill is then rotated at 90 R. P. M. for 18 hours. There is thus obtained a dry powder which disperses readily in water. 10 parts of this powder mixed with about 500 parts of water give a suspension which is suitable for use as an insecticidal spray.

If instead of N-phenyl-N-methylaminoacetonitrile there is used α-diethylaminooctoic nitrile, α-diethylaminophenylacetonitrile or dibutylaminoacetonitrile, similar "redispersible powders" are obtained.

*Example 3*

50 parts of methyleneaminoacetonitrile, 20 parts of the sodium salt of isopropylated naphthalenesulphonic acid, 10 parts of dry salt and 20 parts of the sodium salt of the naphthalenesulphonic acid-formaldehyde condensation product prepared as described in Example 1 of British Specification No. 7137 of 1913 are charged into a ball mill which is then rotated at 90 R. P. M. for 18 hours. There is thus obtained a fine powder which dissolves readily in 25,000 parts of water to give a liquid which is suitable for use as an insecticidal spray.

*Example 4*

45 parts of iminodiacetonitrile are ground in a mortar with 5 parts of the sodium salt of isopropylated naphthalenesulphonic acid. The powder so obtained is dissolved in about 22,000 parts of water to give a liquid which is suitable for use as an insecticidal spray.

*Example 5*

38 parts of sulphonated cod oil are mixed with 16 parts of rosin soap and to this mixture there are added 6 parts of diethylene glycol. There is thus obtained a viscous oil which is then mixed with 40 parts of α-(N-phenyl-N-methyl-amino)-octoic nitrile. There is thus obtained a clear homogeneous viscous oil. If this is poured into 40,000 parts of water, there is formed an emulsion suitable for use as an insecticidal spray.

*Example 6*

54 parts of α-dibutylamino-octoic nitrile, 36 parts of ethanolamine oleate and 10 parts of ethoxyethanol are mixed together. There is thus obtained a clear homogeneous oil which forms stable emulsions when mixed with water. If 1 part of this oil is mixed with 500 parts of water, there is obtained a stable emulsion useful as an insecticidal spray.

If instead of the α-dibutylamino-octoic nitrile, there is used an equal weight of α-(N-phenyl-N-methyl-amino)-octoic nitrile, a similar self-emulsifiable oil is obtained. If 1 part of this oil is added to 500 parts of water, there is likewise obtained a stable emulsion useful as an insecticidal spray.

*Example 7*

10 parts of α-diethylamino-phenylacetonitrile are dissolved in 90 parts of odourless paraffin. There is thus obtained a solution which is suitable for use as a spray in combatting the bed bug (*Cimex lectularius*).

If instead of the α-diethylamino-phenylacetonitrile there is used an equal weight of α-diethylamino-octoic nitrile, or of α-cyclohexylamino-octoic nitrile, or of α-piperidino-octoic nitrile, or of dibutylamino-acetonitrile, there is obtained a solution which is useful as a fly spray.

*Example 8*

3 parts of α-(N-phenyl-N-methyl-amino)-octoic nitrile and 97 parts of talc are mixed together until the mixture is homogeneous. There is thus obtained a dust which is suitable for application to plants to control insect pests.

*Example 9*

4 parts of the resinous extract of derris root (containing about 18% of rotenone) are powdered and mixed with 40 parts of α-(N-phenyl-N-methyl-amino)-octoic nitrile. The mixture is heated to 40° C. and stirred until the resin has dissolved and is then allowed to cool.

35 parts of sulphonated cod oil and 15 parts of rosin soap are mixed and 6 parts of diethylene glycol are added to the mixture whereby there is obtained a viscous oil.

This oil is then mixed with the above-mentioned resin-nitrile solution, whereby there is obtained a clear viscous self-emulsifiable oil which forms stable emulsions with water. If 1 part of this oil is added to 1300 parts of water, there is obtained a stable emulsion suitable for use as an insecticidal spray.

We claim:

1. An insecticidal composition containing as an essential active ingredient alpha-(N-phenyl-N-methylamino)-heptyl cyanide.

2. An insecticidal composition containing as an essential active ingredient an alpha-(N-aryl-N-alkylamino)-heptyl cyanide.

3. An insecticidal composition containing as an essential active ingredient an alpha-aminooctoicnitrile, the amino group of which is the residue selected from the group consisting of primary and secondary amines.

4. An insecticidal composition containing as an essential active ingredient a substituted amino acetonitrile in which hydrogen, cyano and amino radicals are attached to the same carbon atom of an aliphatic hydrocarbon group containing seven carbon atoms, the amino radical being the residue of a secondary amine.

5. An insecticidal composition containing as an essential active ingredient a substituted aminoacetonitrile in which hydrogen, cyano and amino radicals are attached to the same carbon atom of a hydrocarbon group containing at least four and not more than seven aliphatic carbon atoms, the amino radical being the residue selected from the group consisting of primary and secondary amines.

6. An insecticidal composition containing as an essential active ingredient a substituted aminoacetonitrile in which hydrogen, cyano and amino radicals are attached to the same carbon atom of a hydrocarbon group containing from at least four to less than eight carbon atoms, the amino radical being the residue selected from the group consisting of primary and secondary aliphatic amines.

7. An insecticidal composition containing as an essential active ingredient an alpha-(N-phenyl-N-methylamino)-alkyl cyanide.

8. An insecticidal composition containing as an essential active ingredient a substituted aminoacetonitrile in which hydrogen, cyano and amino radicals are attached to the same carbon atom of a hydrocarbon group containing from at least four to less than eight carbon atoms, the amino radical being the residue of a secondary aliphatic amine.

BENJAMIN COLLIE.
ROWLAND HILL.
WILFRED ARCHIBALD SEXTON.